United States Patent [19]
Proksa et al.

[11] Patent Number: 5,788,932
[45] Date of Patent: Aug. 4, 1998

[54] APPARATUS FOR PREPARING FLOWABLE REACTION MIXTURES FROM AT LEAST TWO FLOWABLE REACTANTS

[75] Inventors: Ferdinand Proksa, Leverkusen; Hans-Michael Sulzbach, Koenigswinter; Ferdinand Althausen, Neunkirchen; Reiner Raffel, Siegburg, all of Germany

[73] Assignee: Maschinenfabrik Hennecke GmbH, Leverkusen, Germany

[21] Appl. No.: 26,362

[22] Filed: Mar. 4, 1993

Related U.S. Application Data

[63] Continuation of Ser. No. 511,679, Apr. 20, 1990, abandoned.

[30]     Foreign Application Priority Data

Apr. 26, 1989 [DE] Germany ............... 39 13 681.7

[51] Int. Cl.[6] ........................................ B67D 5/52
[52] U.S. Cl. .............. 422/133; 239/583; 251/282; 422/135; 422/224; 422/226; 425/562; 425/564
[58] Field of Search ..................... 422/131, 133, 422/135, 224, 226; 366/137, 139, 123; 239/583, DIG. 22; 251/31, 281, 282; 425/4 R, 562, 564, 130

[56]     References Cited

U.S. PATENT DOCUMENTS

| | | | |
|---|---|---|---|
| 2,037,619 | 4/1936 | Coatalen | 251/281 |
| 2,141,018 | 12/1938 | Ring | 251/281 |
| 3,771,963 | 11/1973 | Breer et al. | 23/252 R |
| 4,239,732 | 12/1980 | Schneider | 422/133 |
| 4,582,229 | 4/1986 | Proksa et al. | 222/135 |
| 4,749,554 | 6/1988 | Proksy et al. | 422/133 |

FOREIGN PATENT DOCUMENTS 3334375  4/1985  Germany .

*Primary Examiner*—Robert J. Warden
*Attorney, Agent, or Firm*—Joseph C. Gil

[57]     ABSTRACT

An apparatus for preparing flowable reaction mixtures from at least two flowable reactants in which the components are injected into a mixing chamber by means of injection nozzles, the force of the reactant acting upon the nozzle needle is at least substantially compensated to avoid impairing the mixing ratio during a change-over of the nozzle needle. The rear end of the nozzle needle is provided with a chamber communicating with the component supply line.

4 Claims, 5 Drawing Sheets

APPARATUS FOR PREPARING FLOWABLE REACTION MIXTURES FROM AT LEAST TWO FLOWABLE REACTANTS

This application is a continuation of application Ser. No. 07/511,679 filed Apr. 20, 1990, now abandoned.

BACKGROUND OF THE INVENTION

The present invention relates to an apparatus for preparing flowable reaction mixtures from at least two flowable reactants for producing solid or cellular plastics materials. The apparatus broadly comprises storage containers for the reactants, from which supply lines lead via metering pumps to a mix head in whose mixing chamber the supply lines open via injection nozzles, wherein each of the injection nozzles consists of a nozzle housing and a nozzle needle which together form a tight seat at the nozzle opening in the closed state.

The seating nozzles used in the past have the disadvantage that the hydraulic change-over is dependent on the opposing pressure acting upon the nozzle needle. In other words, the acceleration of the nozzle needles changes during opening and closing as the component pressure changes. As a result, the mixing ratio of the reactants can be adversely changed during the critical phase of opening and closing of the injection nozzles, producing undesirable defects in the end product.

The object of the present invention was therefore to provide an apparatus in which the injection nozzles operate at least substantially independently of the opposing pressure of the reactants.

DESCRIPTION OF THE INVENTION

Figure 1:
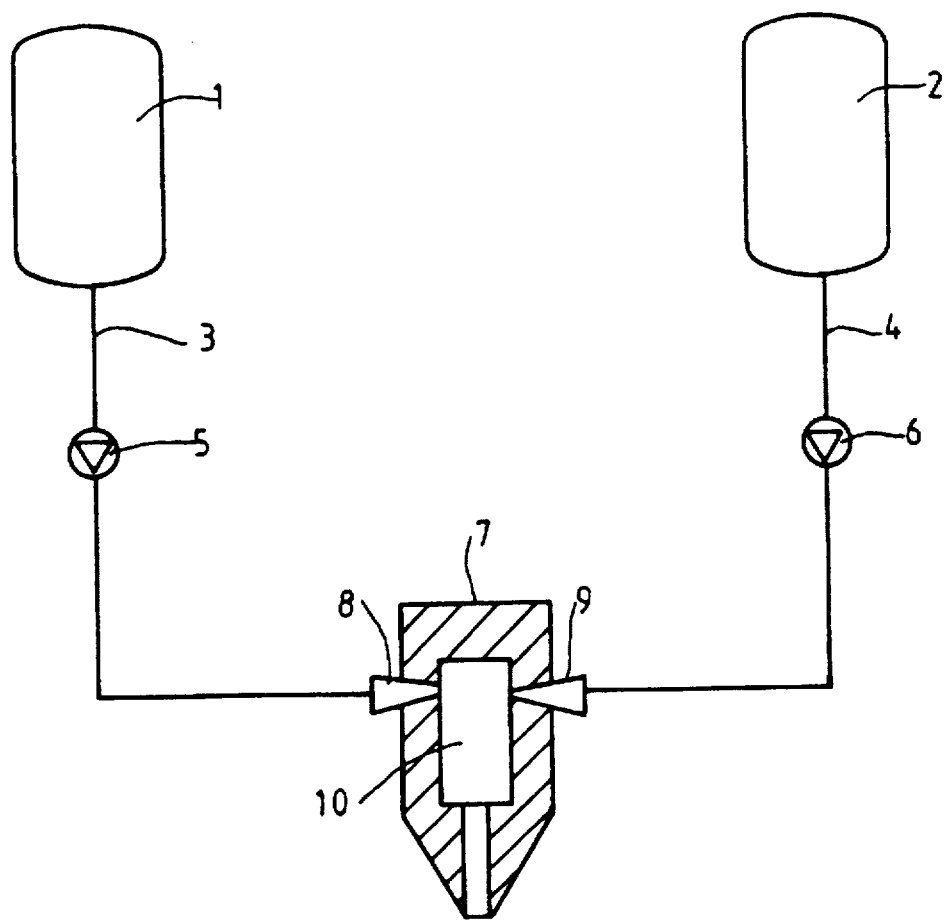
FIG. 1 shows the apparatus in a schematic construction with two injection nozzles.

The above object is achieved by providing the rear end of the nozzle needle with a chamber which is connected to the reactant supply line and by providing the nozzle needle in the chamber with a face which can be loaded in the closing direction, with the projected area of the face in the direction of movement being at most 1.1 times the projected area of the nozzle needle which can be loaded in the opening direction by the reactant. In this way, the axial force acting upon the nozzle needle due to the opposing force of the reactant is minimized during the change-over sufficiently to prevent a change of the component pressure adversely affecting the acceleration of the nozzle needle either during opening or closing. As the closing force slightly exceeds the opening force in this embodiment, this ensures that, if the hydraulic control of the nozzle needles should fail, the injection nozzles will not continue injecting indefinitely, but will automatically close. The novel injection nozzle makes use of far smaller hydraulic drives than normal, so nozzle opening diameters far exceeding 10 mm are possible.

Undesirable changes of the ratio between the reactants during the change-over phases of the injection nozzles, i.e. at the beginning and end of the mixing process, which could give rise to defects in the end product, are also eliminated by this nozzle construction because an almost identical quantity of component per unit time, which is pumped to and fro at the end face of the nozzle needle by the movement of the nozzle needle, is compensated again at the rear of the nozzle needle.

According to a particular preferred embodiment, the mutually opposed projected areas are equal in size. In this case, no more axial force is exerted on the nozzle needle by the working pressure of the reactant. Moreover, the pump effect of the nozzle needle moving in the change-over phase is completely eliminated. However, automatic closure of the nozzles during a failure of the hydraulic control means is no longer possible during injection. Uncontrolled continued injection by the nozzles has to be prevented by other means, for example monitoring of the hydraulic system and disconnection of the metering means.

The novel construction of the apparatus can be applied to mix heads which operate with multi-component nozzles, in particular bi-component nozzles. Such multi-component nozzles are known and described in U.S. Pat. Nos. 4,582,224 and 4,749,554.

The nozzle needles for the second and optionally further reactant(s) are constructed as sleeve-like needles (sleeve needles) concentrically surrounding the first nozzle needle.

Various embodiments of the new apparatus are shown purely schematically in the drawings and are described in more detail below.

In FIG. 1, the apparatus consists of storage containers 1, 2 from which supply lines 3, 4 lead via metering pumps 5, 6 to a mix head 7. The supply lines 3, 4 open via injection nozzles 8, 9, into a mixing chamber 10.

Figure 2:
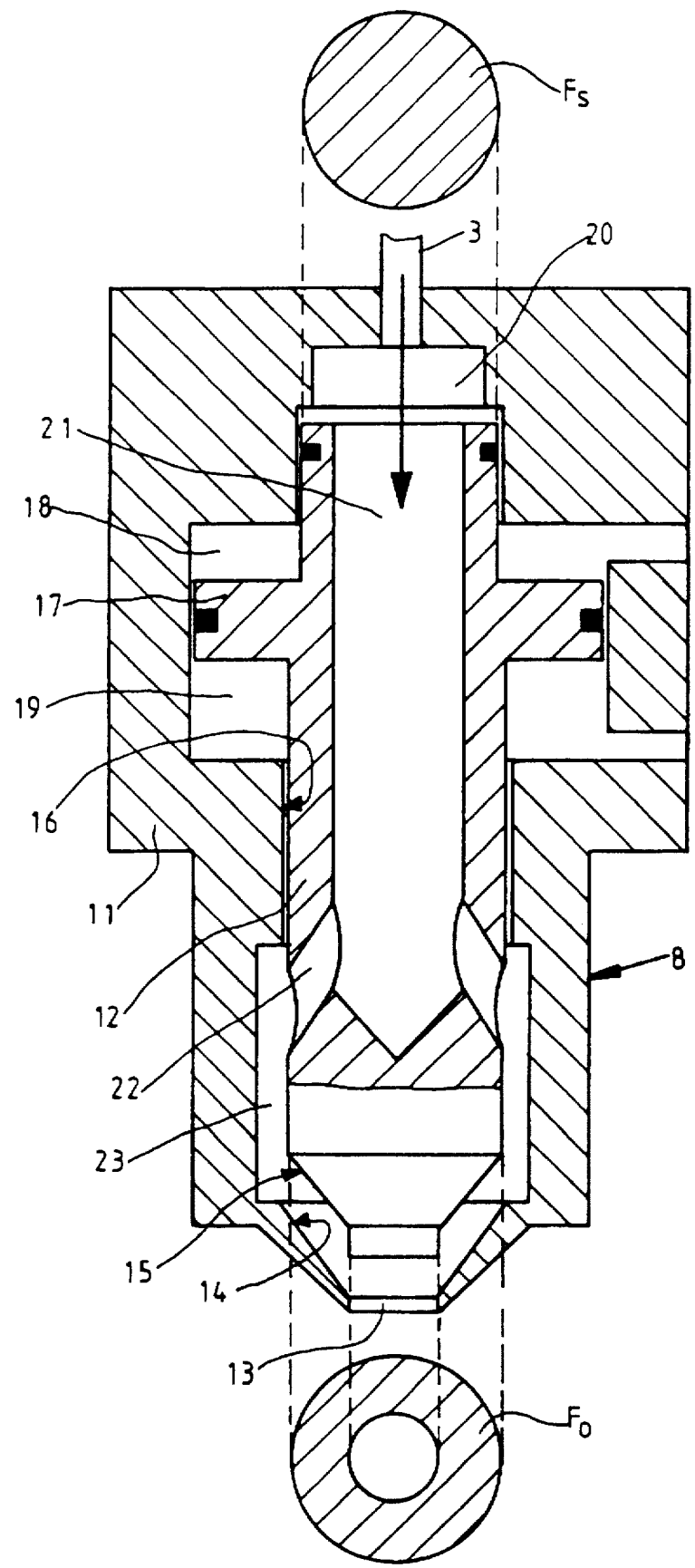
FIG. 2 shows an injection nozzle of the apparatus according to FIG. 1 in an enlarged, detailed illustration, in section.

In FIG. 2, the injection nozzle 8 consists of a nozzle housing 11 and a nozzle needle 12. In the nozzle housing 11 there is arranged a nozzle opening 13 which is surrounded concentrically by a seating face 14. This corresponds to a seating face 15 of the nozzle needle 12. The nozzle needle 12 is guided in a bore 16 and has a piston 17 which can be loaded on both sides and is provided with hydraulic chambers 18, 19 on both sides. These hydraulic chambers 18, 19 are connected to a hydraulic control system (not shown). The supply line 3 opens into a chamber 20 preceding the bore 16 and the nozzle needle 12. The nozzle needle 12 has a central bore 21 which is open toward the chamber 20 and from which channels 22 open into a chamber 23 surrounding the front region of the nozzle needle 12. An adjustable stop for adjusting the stroke height of the nozzle needle 12 is not shown. Change-over means and return lines to which the supply line 3 and nozzle opening 13 can be connected during pauses are not shown either. The projected area $F_o$ of the seating face 15 of the nozzle needle 12 which is effective during opening when pressure is applied is about 0.9 times the projected area $F_s$ effective during closing. The axial force acting upon the nozzle needle due to the pressure of the reactant can be minimized by this dimensioning of the areas $F_o$ and $F_s$ sufficiently to prevent a change of the component pressure adversely affecting the acceleration of the nozzle needle during opening or closing. It is also advantageous that the injection nozzle closes automatically if the hydraulic control system should fail during an injection process.

Figure 3:
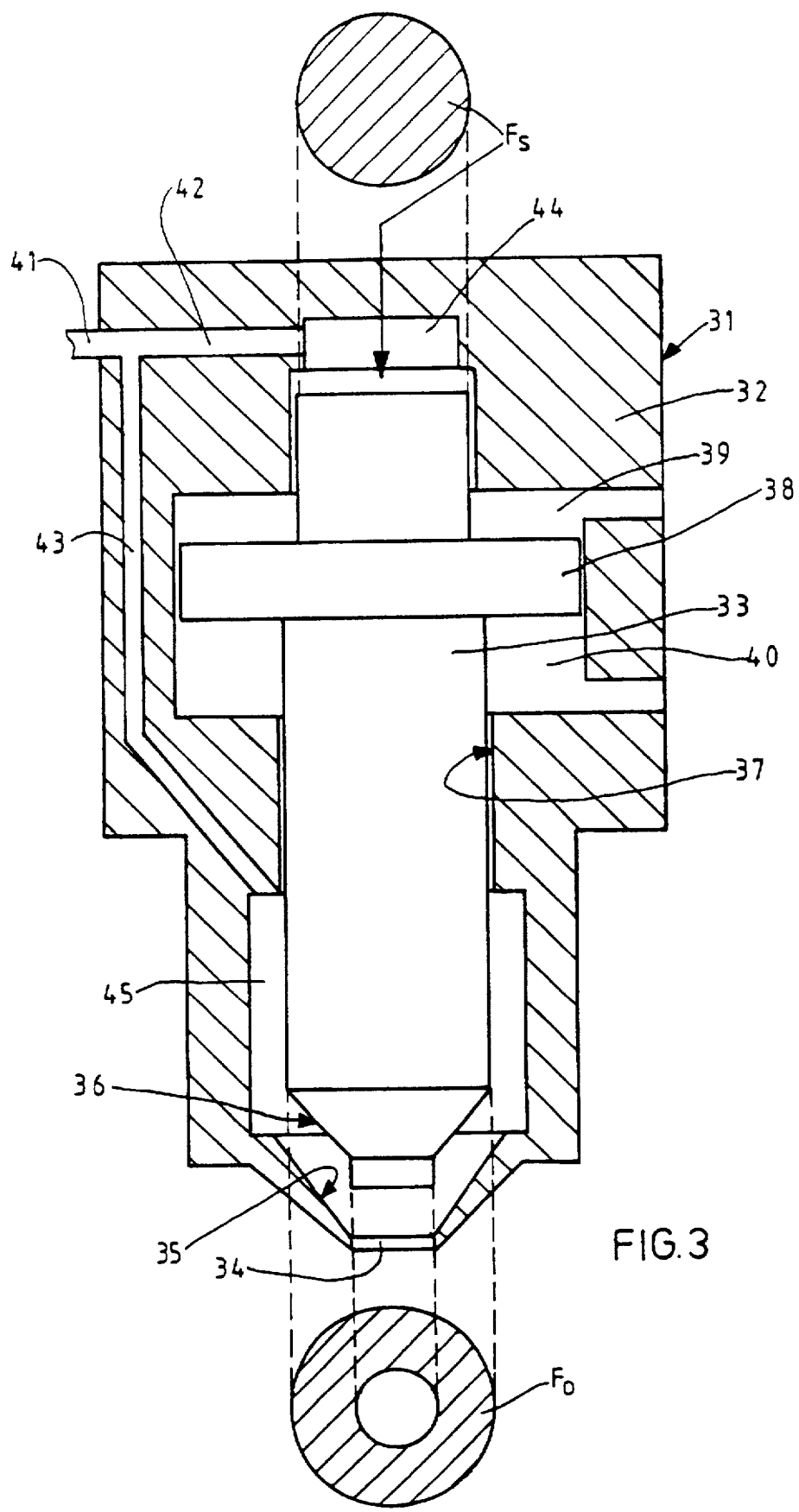
FIG. 3 shows a different embodiment of the injection nozzle according to FIG. 1.

In FIG. 3, the injection nozzle 31 consists of a nozzle housing 32 and a nozzle needle 33. A nozzle opening 34 which is surrounded concentrically by a seating face 35 is arranged in the nozzle housing 32. This seating face 35 corresponds to a seating face 36 of the nozzle needle 33. The nozzle needle 33 is guided in a bore 37 and has a piston 38 which can be loaded hydraulically on both sides and is provided on both sides with hydraulic chambers 39, 40 connected to a hydraulic control means (not shown). A supply line 41 for the reactant branches into two channels 42, 43, of which the channel 42 opens into a chamber 44 located at the rear end of the nozzle needle 33 while the channel 43 opens into a chamber 45 surrounding the front region of the nozzle needle 33. An adjustable stop for adjusting the stroke height of the nozzle needle 33 is not shown. The projected area $F_o$ of seating face 36 of the nozzle needle 33 is 0.9 times as large as the rear end face $F_s$ of the nozzle needle 33 so the same effect is achieved as with the injection nozzle described with reference to FIG. 2.

Figure 4:
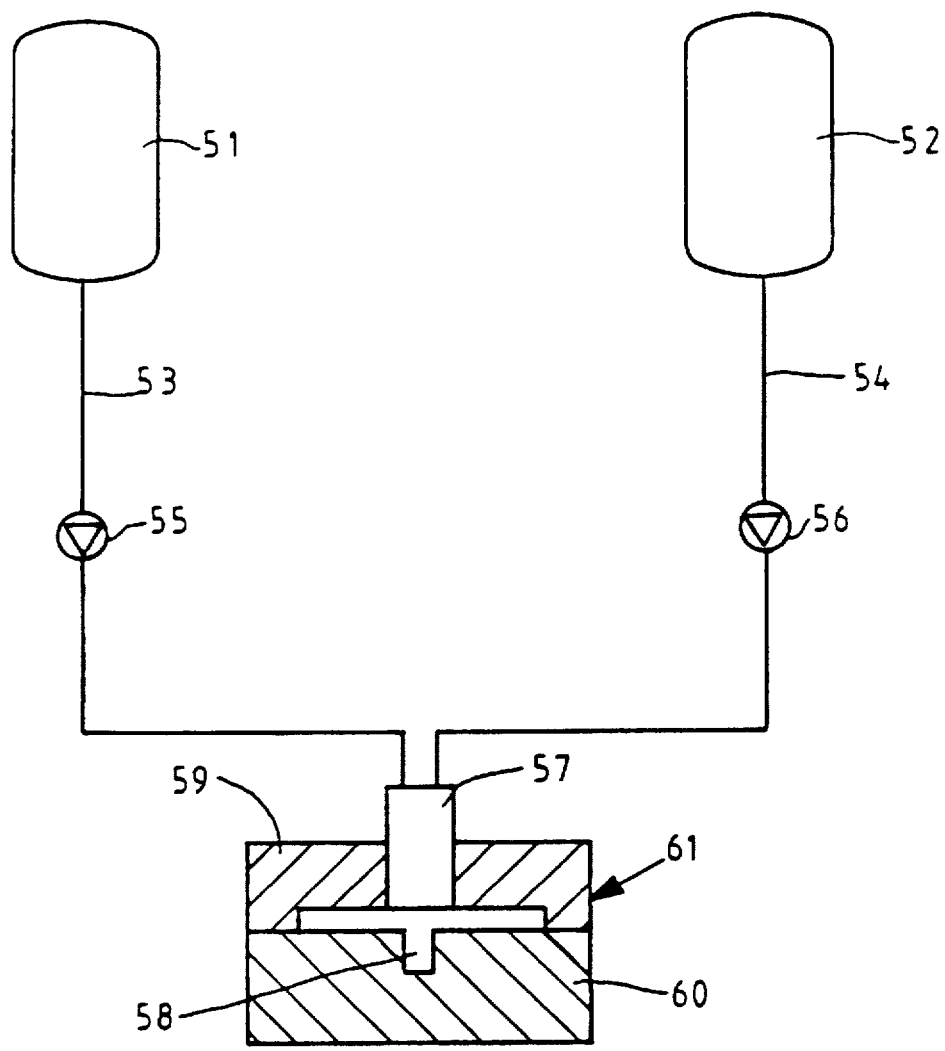
FIG. 4 shows the apparatus in a schematic construction with a bi-component nozzle.

In FIG. 4, the apparatus consists of storage containers 51, 52 from which supply lines 53, 54 lead via metering pumps 55, 56 to a bi-component nozzle 57 which opens into a mixing chamber 58. The bi-component nozzle 57 is arranged in one half 59 and the mixing chamber 58 is arranged in the other half 60 of the molding tool 61.

Figure 5:
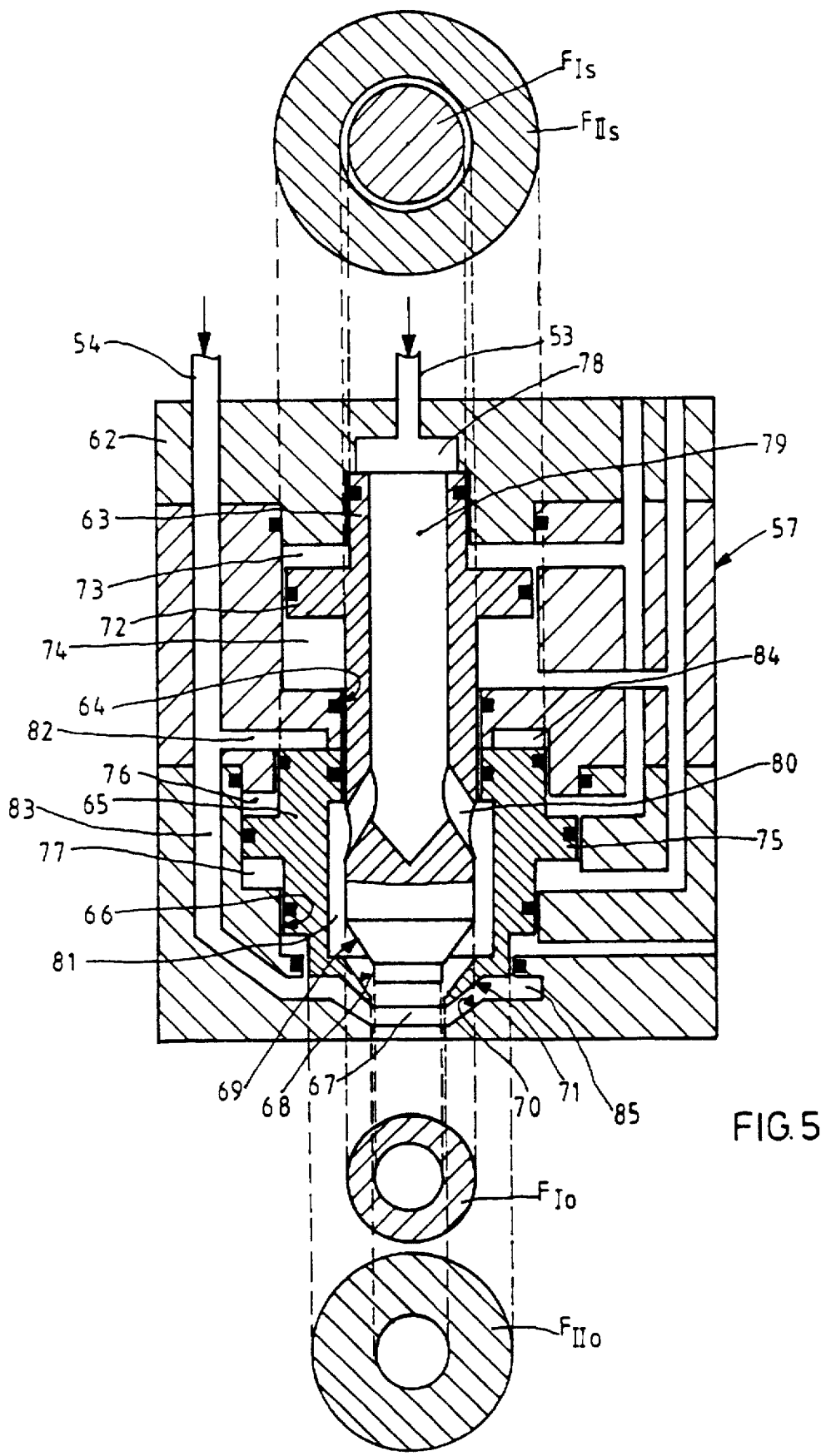
FIG. 5 shows the bi-component nozzle according to FIG. 4 in an enlarged, detailed illustration in section.

This bi-component nozzle 57, through which the two reactants are injected into the mixing chamber 58, is constructed according to FIG. 5. The construction for injection of the first reactant corresponds in principle to the construction of the injection nozzle according to FIG. 2. Referring to FIG. 5, in a nozzle housing 62, a nozzle needle 63 is guided in a bore 64 and a sleeve needle 65 arranged concentrically thereto in a bore 66. Nozzle housing 62 and sleeve needle 65 have a common nozzle opening 67. The sleeve needle 65 is provided with an internal seating face 68 which corresponds to a seating face 69 of the nozzle needle 63. The nozzle housing 62 also has a seating face 70 which corresponds to a seating face 71 arranged externally on the sleeve needle 65. The nozzle needle 63 has a piston 72 which can be hydraulically loaded on both sides and is provided with hydraulic chambers 73, 74. These hydraulic chambers 73, 74 are connected to a hydraulic control means (not shown). The sleeve needle 65 is also provided with a hydraulically loadable piston 75 provided with hydraulic chambers 76, 77. These are also connected to the hydraulic change-over means. The supply line 53 for the first reactant opens in a chamber 78 associated with the rear end of the nozzle needle 63. The chamber 78 is connected via a bore 79 and channels 80 to a chamber 81 surrounding the front region of the nozzle needle 63. The supply line 54 for the second reactant branches into channels 82 and 83, of which the channel 82 opens into a chamber 84 associated with the rear end of the sleeve needle 65, while the channel 83 leads to a chamber 85 concentrically surrounding the nozzle opening 67. The projected area $F_{Io}$ of the seating face 69 of the nozzle needle 63 which is effective during pressure loading with the first reactant during opening is about 0.9 times as large as the projected area $F_{Is}$ of the rear end of the nozzle needle 63 effective during closure. The projected area $F_{IIo}$ of the seating face 71 of the sleeve needle 65 is also about 0.9 times as great as the area $F_{IIs}$ of the rear end of the sleeve needle 65 effective during closure. The effects described with reference to FIG. 2 occur due to this dimensioning. Return lines to which the supply lines 78, 83 can be connected during pauses are not shown.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for preparing flowable reaction mixtures from at least two flowable reactants comprising:

A) storage containers for the reactants,

B) supply lines leading from said storage containers via metering pumps to a mixhead having a mixing chamber, said supply lines opening into said mixing chamber via one or more injection nozzles, C) each of said nozzles consisting of:
 i) a nozzle housing,
 ii) a nozzle outlet opening into said mixing chamber,
 iii) a nozzle needle moveable within said housing, said needle
  a) having a rear end and a forward end with a seating face,
  b) having a central bore and channels in the walls thereof, said channels leading from said central bore into a chamber which surrounds said forward end, and
  c) having 1) a closed position whereby said seating face forms a tight seating at said outlet to thereby prevent reactant from flowing through said outlet and 2) an opened position whereby reactant flows against said seating face and through said outlet,
 iv) hydraulic means for moving said nozzle needle into said open and closed positions, and, D) wherein at least one of said nozzles has a reactant chamber at the rear end thereof, said reactant chamber being connected to a supply line whereby reactant can
 i) flow into said reactant chamber against the rear end to force the needle associated therewith into the closed position, and
 ii) flow through said central bore, through said channels and into the chamber which surrounds said forward end, said rear end having a projected area in the direction in which the needle is moveable no more than 1.1 times the projected area of the seating face in the direction in which the needle is moveable.

2. The apparatus of claim 1, characterized in that the mutually opposed projected areas are equal in size.

3. The apparatus of claim 1, characterized in that the injection nozzles consist of a common multi-component nozzle, wherein the nozzle needles for the second and optionally further reactant(s) are constructed as sleeve needles concentrically surrounding the nozzle needle for the first reactant.

4. An apparatus for preparing flowable reaction mixtures from at least two flowable reactants comprising:

A) storage containers for the reactants,

B) supply lines leading from said storage containers via metering pumps to a mixhead having a mixing chamber, said supply lines opening into said mixing chamber via one or more injection nozzles, C) each of said nozzles consisting of:
 i) a nozzle housing,
 ii) a nozzle outlet opening into said mixing chamber,
 iii) a nozzle needle moveable within said housing, said needle
  a) having a rear end and a forward end with a seating face,
  b) having a chamber surrounding said forward end, said chamber being connected to a supply line whereby reactant can flow into said chamber, and c) having 1) a closed position whereby said seating face forms a tight seating at said outlet to thereby prevent reactant from flowing through said outlet and 2) an opened position whereby reactant flows against said seating face and through said outlet, iv) hydraulic means for moving said nozzle needle into said open and closed positions, and, D) wherein at least one of said nozzles has a reactant chamber at the rear end thereof, said reactant chamber being connected to a supply line whereby the same reactant which flows into the chamber surrounding said forward end can flow into said reactant chamber against the rear end to force the needle associated therewith into the closed position, said rear end having a projected area in the direction in which the needle is moveable no more than 1.1 times the projected area of the seating face in the direction in which the needle is moveable.

* * * * *